(12) United States Patent
Jin et al.

(10) Patent No.: US 7,858,243 B2
(45) Date of Patent: Dec. 28, 2010

(54) INFLUENTIAL FUEL CELL SYSTEMS INCLUDING EFFECTIVE CATHODES AND USE WITH REMEDIATION EFFORTS

(75) Inventors: Song Jin, Fort Collins, CO (US); Jeffrey M. Morris, Lakewood, CO (US); Paul Fallgren, Laramie, WY (US)

(73) Assignee: The University of Wyoming Research Corporation, Laramie, WY (US)

( * ) Notice: Subject to any disclaimer, the term of this patent is extended or adjusted under 35 U.S.C. 154(b) by 202 days.

(21) Appl. No.: 12/054,185

(22) Filed: Mar. 24, 2008

(65) Prior Publication Data

US 2009/0029198 A1    Jan. 29, 2009

Related U.S. Application Data

(60) Provisional application No. 60/919,599, filed on Mar. 22, 2007.

(51) Int. Cl.
*H01M 8/10* (2006.01)
*H01M 8/04* (2006.01)

(52) U.S. Cl. ............... 429/401; 429/443; 429/492; 429/528

(58) Field of Classification Search .......... 429/2, 429/13, 30, 31, 401, 443, 492, 528
See application file for complete search history.

(56) References Cited

U.S. PATENT DOCUMENTS

| | | | |
|---|---|---|---|
| 3,278,335 A * | 10/1966 | Hitzman | 429/2 |
| 4,652,501 A | 3/1987 | Bennetto et al. | |
| 5,292,409 A | 3/1994 | Dixon et al. | |
| 5,456,991 A | 10/1995 | Ong et al. | |
| 5,521,020 A | 5/1996 | Dhar | |
| 5,945,231 A * | 8/1999 | Narayanan et al. | 429/30 |
| 6,610,178 B2 | 8/2003 | Kato et al. | |
| 6,913,854 B1 | 7/2005 | Alberte et al. | |
| 7,005,401 B2 | 2/2006 | Lu et al. | |
| 7,291,751 B2 | 11/2007 | Leiber et al. | |
| 2006/0147763 A1 | 7/2006 | Angenent et al. | |
| 2007/0259216 A1 | 11/2007 | Logan | |

FOREIGN PATENT DOCUMENTS

| | | |
|---|---|---|
| WO | 03096467 A1 | 11/2003 |
| WO | 2006044954 A2 | 4/2006 |

(Continued)

OTHER PUBLICATIONS

"Economic Analysis of the Utilization of Oil from Tar Sands", Zeninskii et al., Chemistry and Technology of Fuels and Oils, vol. 16, No. 1, Jan. 1980, p. 33-35.*

(Continued)

*Primary Examiner*—Jonathan Crepeau
*Assistant Examiner*—Kenneth Douyette
(74) *Attorney, Agent, or Firm*—Santangelo Law Offices, PC (57) ABSTRACT

Embodiments may include efficient fuel cell systems including an anode, a cathode, a lead-containing cathode catalyst, at least one proton exchange connector, and perhaps even an external circuit between the anode and the cathode. Other embodiments may include enhanced degradation of contaminants in environmental media such as perhaps petroleum hydrocarbon in groundwater with microbial fuel cells and the like.

21 Claims, 8 Drawing Sheets

FOREIGN PATENT DOCUMENTS

| WO | 2006099220 A2 | 9/2006 |
| --- | --- | --- |
| WO | 2007006107 A2 | 1/2007 |
| WO | 2007027730 A2 | 3/2007 |
| WO | 2007030943 A1 | 3/2007 |
| WO | 2007042841 A1 | 4/2007 |
| WO | 2007112563 A1 | 10/2007 |
| WO | 2007131022 A2 | 11/2007 |
| WO | 2007131029 A2 | 11/2007 |

OTHER PUBLICATIONS

"Harnessing the Power of Poop", Karen Miller, May 19, 2004. Retrieved online on Mar. 6, 2010 from http://www.space.com/businesstechnology/astronaut_electricity_040519.html.*

"A Microbial fuel cell using permanganate as the cathodic electron acceptor", You et al., Journal of Power Sources 162 (2006) p. 1409-1415.*

Bass, David et al.; Performance of air sparging systems: a review of case studies; Journal of Hazardous Materials; 72 (2000) 101-119.

Berkey, Jennifer et al.; Tracer studies for evaluation of in situ air sparging and in-well aeration system performance at a gasoline-contaminated site; Journal of Hazardous Materials B98 (2003) 127-144.

Morris, Jeffrey, et al.; Lead oxide as an alternative catalyst to platinum in microbial fuel cells; Electrochemistry Communications; vol. 9, Issue 7, Jul. 2007; 1730-1734.

www.eurekalert.org/pub_releases/2004-02/ps-mfc022304.php; Microbial fuel cell cleans, generates electricity from domestic wastewater; Barbara Hale, Penn State, Feb. 23, 2004.

Johnston, C.D., et al.; Effectiveness of in situ air sparging for removing NAPL gasoline from a sandy aquifer near Perth, Western Australia; Journal of Contaminant Hydrology 59 (2002) 87-111.

Kao, C.M., et al.; Laboratory column studies for evaluating a barrier system for providing oxygen and substrate for TCE biodegradation; Chemosphere 44 (2001) 925-934.

Kao, C.M., et al.; Remediation of PCE-contaminated aquifer by an in situ two-layer biobarrier: laboratory batch and column studies; Water Research 37 (2003) 27-38.

Koenigsberg, S., et al.; The Efficacy of Oxygen Release Compound: A Six Year Review; 6 pages, Jun. 3, 2001.

Lui, S, et al.; Laboratory column study for remediation of MTBE-contaminated groundwater using a biological two-layer permeable barrier; Water Research 40 (2006) 3401-3408.

Morris, J. et al; Toxic/Hazardous Substances and Environmental Engineering; Journal of Environmental Science and Health, Part A (2008) 43, 18-23.

Penn State (Apr. 24, 2005) Microbial Fuel Cell: Hydrogen Source and Wastewater Cleaner. ScienceDaily; retrieved from http://www.sciencedaily.com/releases/2005/04/050422165917.htm; 2 pages.

U.S. Appl. No. 60/919,599, filed Mar. 22, 2007; entitled "Use of microbial fuel cell design in groundwater remediation and efficient cathode for microbial and hydrogen fuel cells;" 14 pages.

http://www.microbialfuelcell.org/general.htm; General Principles of Microbial Fuel Cells; Microbial Aspects of MFCs; 6 pages Printed Mar. 18, 2008.

Morris, Jeffrey, et al.; Enhanced Anaerobic Biodegradation of Diesel in a Microbial Fuel Cell; Western Research Institute; 24 pages; available on line May 27, 2008.

* cited by examiner

INFLUENTIAL FUEL CELL SYSTEMS INCLUDING EFFECTIVE CATHODES AND USE WITH REMEDIATION EFFORTS

This is the U.S. non-provisional patent application claiming the benefit of U.S. Provisional Application No. 60/919,599, filed Mar. 22, 2007, hereby incorporated by reference herein.

ACKNOWLEDGMENT OF GOVERNMENT SUPPORT

This technology relates to work performed under U.S. DOE Cooperative Agreement #DE-FC26-98FT40322. The U.S. government may have certain rights in this inventive technology, including "march-in" rights, as provided for by the terms of U.S. DOE Cooperative Agreement #DE-FC26-98FT40322.

BACKGROUND OF THE INVENTION

There is an increasing demand for energy conversion devices such as fuel cells which can produce electricity from fuel and oxidants. Many combinations of fuel and oxidants are possible. A fuel cell may be a microbial fuel cell, hydrogen fuel cell or the like. A hydrogen cell may use hydrogen as fuel and oxygen as oxidant. Other fuels may include hydrocarbons, alcohols, and organic wastes. Other oxidants may include air, chlorine, chlorine dioxide or the like. A microbial fuel cell (MFC) (perhaps called biological fuel cell) may be a device in which microorganisms may oxidize compounds such as glucose, acetate, wastewater, or the like. Electrons gained from this oxidation may be transferred towards an electrode, called the anode. From the anode, the electrons may depart through an electrical circuit towards a second electrode, the cathode. At a cathode, the electrons may be transferred towards a high potential electron acceptor, such as for example, oxygen. As current may flow over a potential difference, power is generated as a result of bacterial activity or the like.

In the past, fuel cells have commonly used platinum as a catalyst. In U.S. Pat. No. 7,291,751 to Leiber et al, lead may be used as a supplemental promoter to perhaps enhance catalytic properties of a catalyst such as platinum. However, the Leiber patent does not discuss use with lead alone as a catalyst.

There is also an increasing need for new technologies applicable to cleaning up wastewater, groundwater and the like. Previous groundwater remediation systems may include air based remediation systems such as air sparging. Air sparging may commonly be used in remediation technology which may volatize and may even enhance aerobic biodegradation of contamination in groundwater and saturated zone soil. Air sparging may involve the injection of air under pressure into saturated zone soils. The injected air may displace water, create air-filled porosity in the saturated soils, which may volatize and remove dissolved and absorbed phase volatile organic compounds (VOCs), and may transfer oxygen into the groundwater. As a result, both physical removal and aerobic biodegradation of contamination in groundwater and saturated zone soil may be enhanced.

Other methods of degradation may include the use of a microbial fuel cell as mentioned above. A microbial fuel cell is a device that may generate electrical current by harnessing electron transport involved in anaerobic microbial metabolism. Past systems may include an upflow microbial fuel cell as discussed in U.S. publication no. 2006/147763 A1 to Angenent et al. This type of fuel cell may be difficult to use with in situ remediation of subsurface saturated and unsaturated zones.

Accordingly, there is a need for improved fuel cell systems and improved remediation treatments of contaminants.

SUMMARY OF THE INVENTION

The present invention includes a variety of aspects, which may be selected in different combinations based upon the particular application or needs to be addressed. In embodiments, the invention may include efficient cathode systems for use in fuel cells such as but not limited to microbial fuel cells, hydrogen fuel cells, enzyme fuel cells, biocell fuel cells, light fuel cells, hybrid fuel cells such as those based on hydrogen fuel cells, microbial fuel cells, enzyme fuel cells, or light fuel cells, or any other types of fuel cells, and the like.

An object of the present invention may include, in embodiments, methods and apparatus for efficient cathode catalysts for use in fuel cells.

Another object of the present invention may include, in embodiments, the use of lead, zinc, titanium, or perhaps even manganese, or even any mixture of these metals or metal oxides containing these metals, (e.g., lead dioxide, zinc oxide, and the like) as a cathode catalyst in fuel cells.

Another object of the present invention may include, in embodiments, improving power generation of microbial fuel cells and lowering production costs of fuel cells.

In yet other objects, embodiments of the present invention may include fuel cells (perhaps even conventional fuel cells or even fuel cells having efficient cathodes as discussed herein) for use in remediating organic contaminants (e.g., petroleum compounds or the like) in a saturated subsurface such as groundwater or the like.

Another object of the present invention may include, in embodiments, providing an alternative electron acceptor at the anode, e.g., microbial consortium which may eliminate a need to amend the environment with additional terminal electron acceptors (ie., oxygen, nitrate, sulfate).

Yet another object of the present invention may include, in embodiments, systems which provide faster degradation of contaminant substances.

Naturally, further objects, goals and embodiments of the inventions are disclosed throughout other areas of the specification.

BRIEF DESCRIPTION OF THE DRAWINGS

FIGS. 4a and 4b is an example of a degradation of contaminations as resulted in an experiment which shows a decrease in diesel range organics (DRO; (FIG. 4a) and an increase in sulfate (FIG. 4b) in double-cell microbial fuel cells (MFC) and control MFCs (Control) with a disconnected external circuit (i.e., no power generation) during a 21-d experiment. Error bars are ± the standard error of the mean (n=3) of replicate experiments. Significant differences between treatments are indicated with brackets.

DETAILED DESCRIPTION OF THE PREFERRED EMBODIMENTS

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Various embodiments of the present invention may include but are not limited: 1) use of lead-containing materials (e.g., $PbO_2$), manganese-containing materials (e.g., $Mn_2O_3$), zinc-containing materials (e.g., ZnO), titanium-containing materials (e.g., TiO), or perhaps even a mixture of these materials (e.g., Mn—Pb alloy) as a cathode catalyst in fuel cells, such as MFC, hydrogen fuel cells and the like; 2). use of iridium (Ir) as a cathode catalyst as in 1); 3). use of stainless steel woven cloth or even mesh as a base, electrically plated with a catalyst metal as in 1) as cathode for fuel cells such as MFC, hydrogen fuel cells or the like; and 4). use of compounds with oxidizing potentials lower than oxygen as electron acceptors in the cathode of MFC or hydrogen fuel cell, such compounds include but are not limited to nitrate, sulfate, etc.

Specifically, embodiments of the present invention may include:

(1) methods for efficient electrochemical energy conversion comprising the steps of generating electrons and protons in an anode chamber of a fuel cell, wherein said anode chamber comprises at least one anode; transferring said electrons from said anode chamber to a cathode chamber of said fuel cell via an external circuit; driving an electrical current through said external circuit with a lead-containing cathode catalyst and at least one cathode in said cathode chamber; connecting said anode chamber and said cathode chamber with at least one proton exchange connector; and generating electrical power;

(2) efficient electrochemical energy conversion devices comprising at least one anode; at least one cathode; a lead-containing cathode catalyst; at least one proton exchange connector between said at least one anode and said at least one cathode; and an external circuit between said at least one anode and said at least one cathode providing electrons from said at least one anode to said at lease one cathode;

(3) a method for efficient electrochemical energy conversion comprising the steps of generating electrons and protons in an anode chamber of a fuel cell, wherein said anode chamber comprises at least one anode; transferring said electrons from said anode chamber to a cathode chamber of said fuel cell via an external circuit; driving an electrical current through said external circuit with a manganese-containing cathode catalyst and at least one cathode in said cathode chamber; connecting said anode chamber and said cathode chamber with at least one proton exchange connector; and generating electrical power;

(4) an efficient electrochemical energy conversion device comprising at least one anode; at least one cathode; a manganese-containing cathode catalyst; at least one proton exchange connector between said at least one anode and said at least one cathode; and an external circuit between said at least one anode and said at least one cathode providing electrons from said at least one anode to said at least one cathode;

(5) a double chamber dual acting in-situ microbial fuel cell device for waste remediation and energy generation comprising at least one anode in a closed anaerobic anode chamber located within an environmental media; at least one anaerobic microbial population and at least one contaminant in said closed anaerobic anode chamber located within said environmental media; an open cathode chamber positioned at or near a surface of said environmental media; a proton exchange connector connecting said closed anaerobic anode chamber and said open cathode chamber to transfer protons from said at least one anode of said closed anaerobic anode chamber to at least one cathode of said open cathode chamber; and an external circuit between said closed anaerobic anode chamber and said open cathode chamber to create electrical power over a potential difference from said closed anaerobic anode chamber and said open cathode chamber; and (6) a method of multi-purpose in-situ microbial fuel cell functions for waste remediation and energy generation comprising the steps of providing an environmental media having at least one microbial population and at least one contaminant; creating a closed anaerobic anode chamber within said environmental media; metabolizing said at least one contaminant in said environmental media with said at least one microbial population to generate electrons and protons in said closed anaerobic anode chamber; degrading at least some of said at least one contaminant; extracting electrons from said closed anaerobic anode chamber with at least one anode in said closed anaerobic anode chamber; transferring said electrons from said closed anaerobic anode chamber to an open cathode chamber through an external circuit, wherein said open cathode chamber is located at or near a surface of said environmental media; generating electrical power from said transfer of said electrons from said closed anaerobic anode chamber to said open cathode chamber; transferring protons from said closed anaerobic anode chamber to said open cathode chamber with a proton exchange connector between said at least one anode to at least one cathode of said open cathode chamber; and reacting oxygen with said protons in said open cathode chamber to create by-products.

Figure 1:
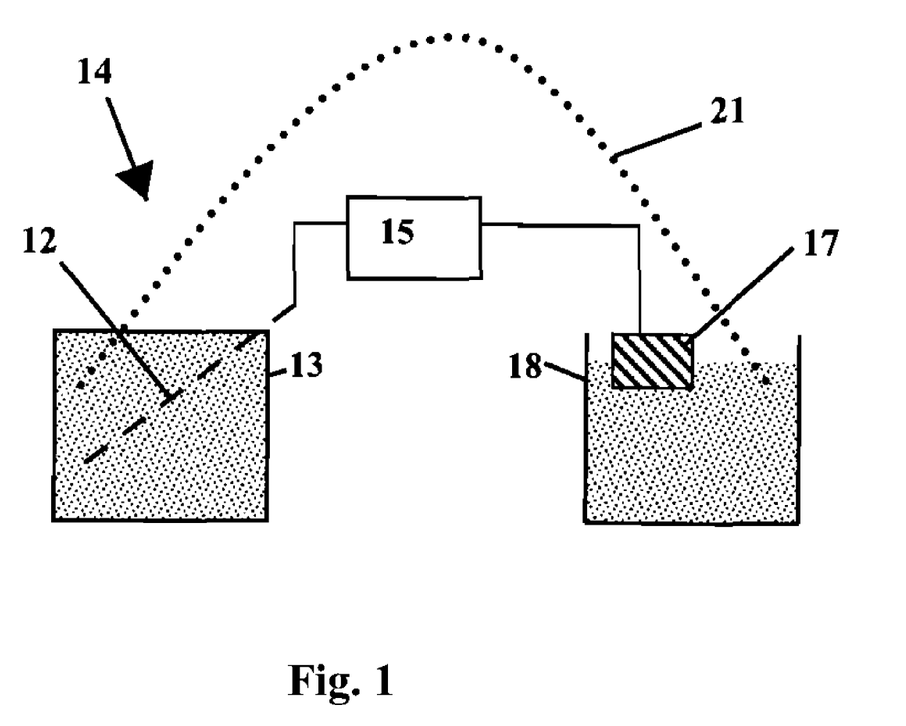
FIG. 1 is an example of an embodiment of fuel cell design as may be understood in the various embodiments of the present invention.

FIG. 1 shows an example of a fuel cell (14) which, in embodiments, may include a closed anaerobic anode chamber (13) and an open cathode chamber (18). An anode (12) may be connected to an external circuit (15) which is connected to a cathode (17). Anode and cathode chambers may be connected with a proton exchange connector such as a proton bridge (21) as shown here.

At least one cathode may be located in a cathode chamber. Cathodes may be used with various fuel cells including but not limited to microbial fuel cells ("MFCs"), hydrogen fuel cells, enzyme fuel cells, biocell fuel cells, light fuel cells, hybrid fuel cells such as those based on hydrogen fuel cells, microbial fuel cells, enzyme fuel cells, or light fuel cells, or any other types of fuel cells. In embodiments, cathodes may be fabricated using carbon cloth, carbon paper, or the like perhaps coated on one side with a carbon paste that contains about 10% platinum ("Pt"). To further enhance the efficiency of these cathodes, proton exchange membranes (such as Nafion®, or the like) may be applied to a catalytic inner side of a cathode to limit oxygen diffusion into anaerobic MFC. Additionally, waterproofing materials (such as Teflon®, PTFE, or the like) may be applied to the outside of a cathode to limit water loss from a MFC. The platinum on a cathode may catalyze a reduction of oxygen (diffusing into a MFC through the cathode) and hydrogen (diffusing across an inside of a MFC from an anode to a cathode) and may even consume electrons flowing from an anode to a cathode, thus, creating an electrical current. Although platinum may be a good catalyst for this reaction, scaling up a system and perhaps even optimizing power generation could potentially be constrained by a high cost of using platinum in cathode fabrication. Past systems may have used cobalt as an alternative to platinum, which may also be an expensive material.

In a MFC, microbes, perhaps found in an anode chamber, may oxidize various substrates under anoxic conditions and, rather than utilizing natural terminal electron acceptors such as nitrate or sulfate, may pass electrons to a solid-state electron acceptor. As can be demonstrated in FIG. 9, electrons (10) may travel from an anode (12) through an external circuit (15) with some type of load (e.g., a resistor, light bulg, etc.) to a cathode (17) that may be in contact with oxygen. The electrons may be consumed through a reaction that combines oxygen and protons (11) such as hydrogen (perhaps produced during oxidation at the anode) at the cathode to produce water. Protons (11) may move from an anode (12) to a cathode (17) via a proton exchange membrane (20).

Figure 9:
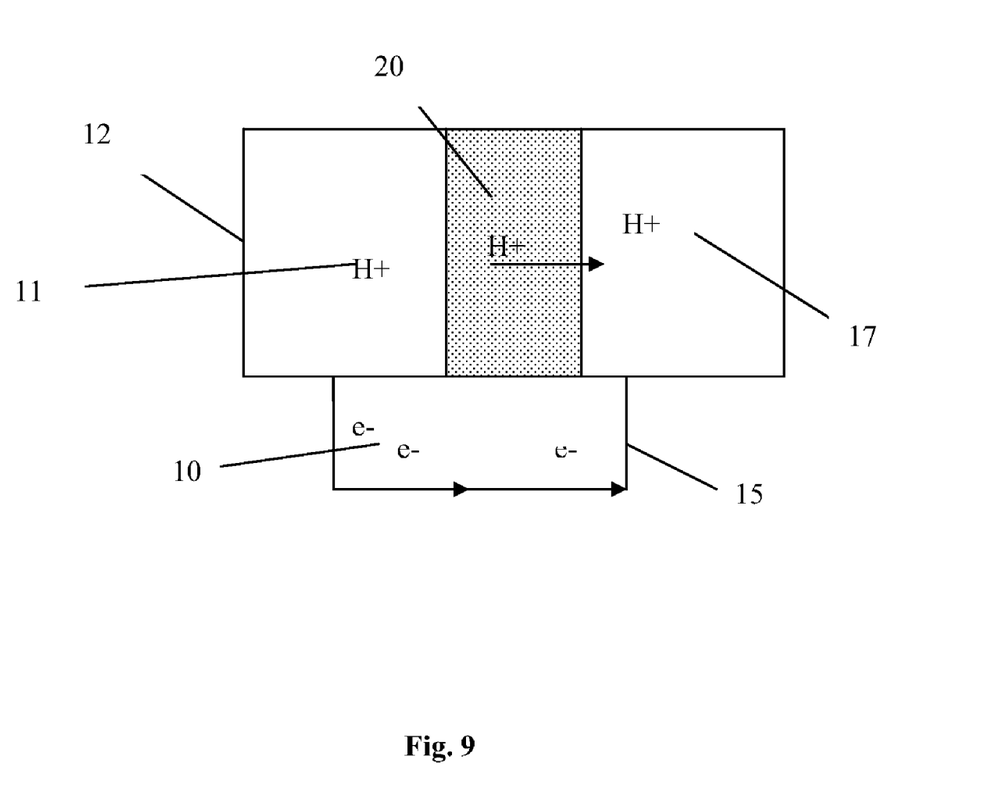
FIG. 9 is an example of an embodiment of single cell fuel cell design as may be understood in the various embodiments of the present invention.

Maximum power production in a MFC may be influenced by many factors including cell design, microbial species, microbial activity, substrate composition and concentration, and temperature. For example, in embodiments, an anode chamber and a cathode chamber may be designed in a single cell system having a single chamber fuel cell as seen in FIG. 9. In other embodiments, an anode chamber and a cathode chamber may be designed in a double cell system as seen in FIG. 1. One important factor which may influence power production may be a cathode catalyst, which may drive oxygen reduction and, therefore, may directly influence the electrical current produced in an external circuit. In the past, one of the most commonly used and one of the most effective catalysts may be platinum (Pt). Although power production may be higher when using platinum or other materials such as cobalt tetramethylphenylporphyrin (CoTTMP) as catalysts in MFCs as compared to not using a catalyst, the cost of using these materials may be prohibitive to scaling up MFC designs for large applications such as municipal wastewater treatment. Therefore, there is a need for catalyst materials that perform at a comparable level to platinum but cost substantially less.

In embodiments, fuel cells may include a lead-containing cathode catalyst. A fuel cell may drive an electrical current through an external circuit with a lead-containing cathode catalyst in an open cathode chamber. A lead-containing cathode catalyst may include any type of lead cathode. A lead-containing cathode may contain other metals in addition to lead to further enhance the performance of the cathode. In embodiments, a lead-containing cathode may include other non-noble metals. In embodiments, MFCs, hydrogen fuel cells, or other fuel cells may be equipped with lead dioxide ($PbO_2$) perhaps even with a specifically unique beta configuration. Lead dioxide plated cathodes may produce the same or perhaps even more power than carbon-platinum cathodes and surprisingly the fabrication cost of lead cathodes may be significantly less than carbon-platinum cathodes. A cathode design may hold high potential for producing efficient cathodes at low cost and may even substantially increase power generation by using other catalytic metals (such as Pb) as plating materials. Furthermore, a micro layer of metal applied to mesh during electro-plating may allow cost effective use of expensive catalysts such as platinum in this design. These mesh cathodes may be approximately 20 times more conductive than carbon-based cathodes and the effective catalytic surface area may be approximately 6.5 times greater on the mesh cathodes, perhaps assuming a 10% Pt loading on carbon-Pt cathodes translates to a 10% catalytic surface area, which may even be an over estimation. Replacement of platinum in fuel cells may reduce the cost of these devices and expand their applications.

In addition, other embodiments may provide fuel cells having a platinum-containing cathode catalyst or even a manganese-containing cathode catalyst. Each of these catalysts may drive an electrical current through an external circuit with a platinum-containing cathode catalyst or even a manganese-containing cathode catalyst in a cathode chamber.

Generally, embodiments may include a fuel cell having an anode, a cathode, at least one proton exchange connector and an external circuit between the anode and the cathode. At least one anode may be placed in an anode chamber environment or perhaps even in a closed anaerobic anode chamber. Other substances which may be found in an anode chamber of a fuel cell may include but is not limited to hydrogen, enzymes, microorganisms, glucose, sulfur, iron, acetate, wastewater, subsurface contaminants, sulfide, petroleum hydrocarbons, diesel range organics, glucose, sewage sludge, organic compounds & inorganic compounds—other organic and inorganic compounds of reduced format (perhaps with potential of being oxidized), gasoline, diesel, and the like.

A cathode may rely on oxygen or even oxidants with oxidizing potentials higher than oxygen as electron acceptors, and the like to complete an electron/proton circuit. Embodiments may utilize ambient air, oxygen releasing compounds such as but not limited to permanganate, peroxide, and the like as an oxygen supply in a cathode chamber and perhaps even an open cathode chamber. This may limit MFC applications due to the fact that oxidized environments may not exist ubiquitously.

A cathode chamber may include a cathode electron acceptor including but not limited to permanganate, cynide, selenium, oxygen, oxygen-releasing compounds, chlorinated organic compounds, peroxides, and the like. Other cathode electron acceptors may include compounds with oxidizing potentials higher than oxygen such as but not limited to halogenated compounds, oxidants of permanganate, percarbonate, peroxide, persulfate, ozone, and the like. Other cathode electron acceptors may include compounds with a lower oxidizing potential than oxygen such as but not limited to nitrate, sulfate, iron, manganese, arsenate, selenate, uranium, chromate, and the like. In embodiments, nitrate can serve as an electron acceptor in a MFC or even hydrogen fuel cell cathode, producing power. This may suggest that compounds with higher oxidizing potential than oxygen may not be necessary for a fuel cell to operate.

Figure 2:
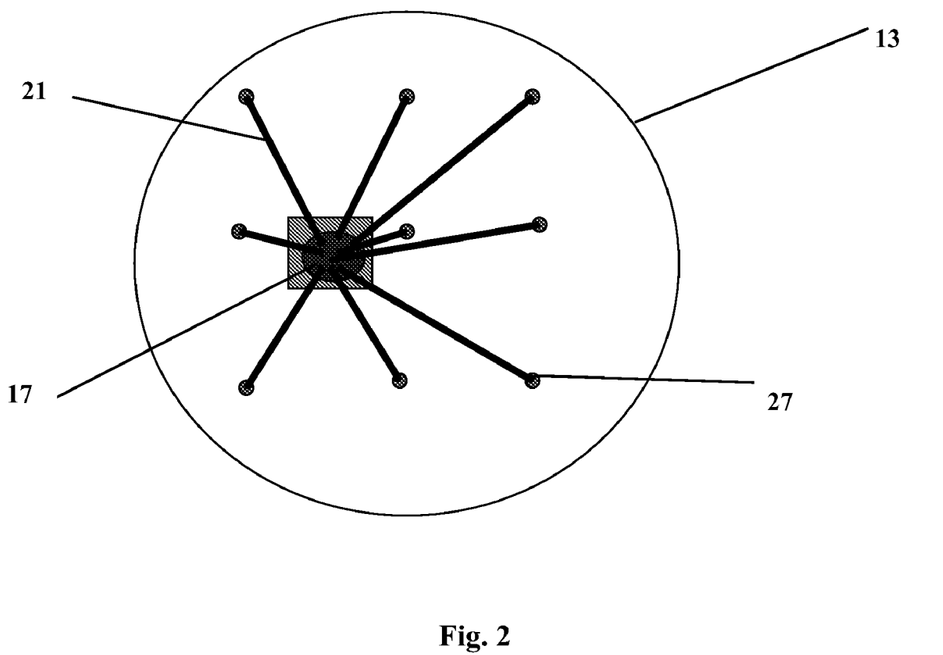
FIG. 2 shows an aerial view of an example of a field application of a MFC in remediating petroleum impacted groundwater as may be understood in the various embodiments of the present invention.
Figure 3:
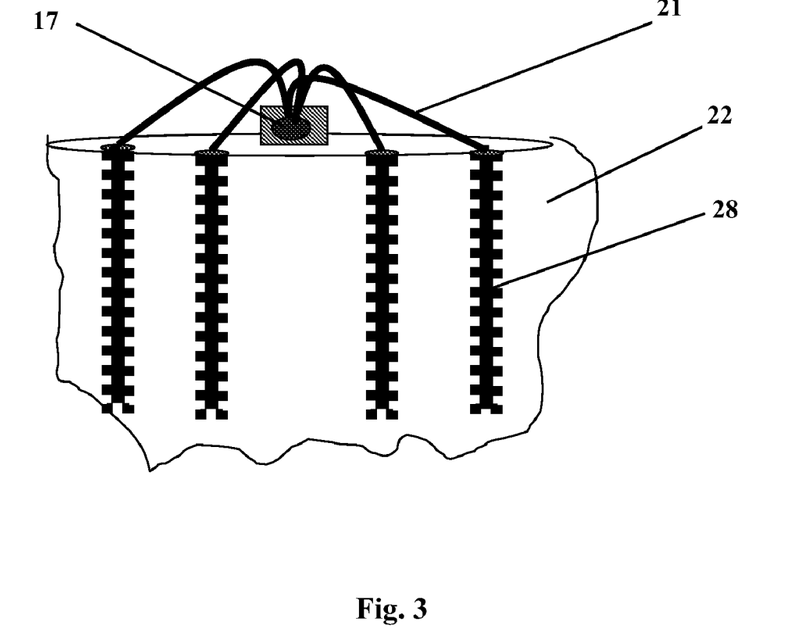
FIG. 3 shows a vertical view of an example of a field application of MFC in remediating petroleum impacted groundwater as may be understood in the various embodiments of the present invention.

A proton exchange connector may connect an anode and a cathode in various embodiments to move protons generated in an anode chamber move or even flow into a cathode chamber. A proton exchange connector may include but is not limited to a proton exchange membrane, a conductive liquid medium, at least one proton bridge, multiple proton bridges, or the like between an anode and a cathode. As shown in FIGS. 2 and 3, multiple proton bridges or even a network of proton bridges may connect at least one cathode chamber to multiple anodes in an anode chamber. A proton bridge may be a less expensive option and may even be used when it is necessary to separate an anode from a cathode. However, as discussed below, fuel cells for uses with remediation application may not need a bridge or membrane between an anode and cathode.

As typical environmental contaminants, petroleum hydrocarbons (e.g., gasoline and diesel range compounds) can be biodegraded, in embodiments, through a series of microbial pathways, in which petroleum hydrocarbons may serve as a substrate and can even be oxidized under both aerobic and anaerobic conditions. Electrons from hydrocarbon substrates may be extracted by microbes and transferred to electron acceptors, such as oxygen (aerobic) and nitrate (anaerobic). Aerobic biodegradation, in which oxygen serves as the terminal electron acceptor, may be a thermodynamically favorable pathway since microorganisms can gain more energy from the electron transport to oxygen. In a saturated subsurface environment such as groundwater, oxygen may be depleted by microbial respiration, and other electron acceptors (e.g., nitrate, sulfate, or the like) can be used. This anaerobic process may be thermodynamically less favorable for microbial energy gain and a biodegradation rate may be lower than that in an aerobic process.

In embodiments, a microbial fuel cell (MFC) may be a device that may harvest electrons from anaerobic degradation of substrates, perhaps even organic substrates such as petroleum hydrocarbons, and generates electricity in a complete circuit. Fuel cells may provide oxidation of organic or even inorganic substances and the like to generate electrons and protons. A MFC may provide anaerobic bacteria with a solid-state terminal electron acceptor (anode) that can transfer electrons originated from biodegradation of these organic compounds (in the anode chamber of the MFC) into the cathode chamber, where electrons may be consumed by oxygen and protons to form an end product, such as $H_2O$. A microbial population may include various kinds of bacteria including but not limited to indigenous bacteria (e.g., bacteria which may already be located in an environmental media), supplemental bacteria (e.g., bacteria which may be added to a system), iron-reducing bacteria, denitrifying bacteria populations, sulfate-reducing bacteria populations, methanovenic bacteria, fermenting bacteria, bacteria species such as *Citrobacter* sp., *Pseudomonas* sp., *Strehotrophomonas* sp., *Shewanella* sp. ANA-3, *Alishewanella* sp., methanogenic organisms, γ-Proteobacteria, *Citramonas* sp., *Desulfovibrio* sp., and *Dechloromonas*, and the like. Embodiments may include a MFC which can successfully generate electricity using petroleum hydrocarbons (diesel) as the substrate (voltage as high as about 124 $mW/m^2$ cathode), and biodegradation rates of petroleum appear to be increased when a MFC may be included.

Some embodiments may couple a MFC technology, such as those discussed herein, with the biodegradation of at least one contaminant which may include but is not limited to organic substrates, inorganic substrates, subsurface contaminants, petroleum hydrocarbons, diesel, petroleum, diesel range organic compounds, gasoline, sewage sludge, and the like. Specifically, embodiments may provide biodegradation of petroleum hydrocarbons in a saturated subsurface such as groundwater. These contaminants may be reduced by various systems and methods of the present invention. Examples of the percentage of reduction in contaminants may include but are not limited to about 50%, about 55%, about 60%, about 65%, about 70%, about 75%, about 80%, about 85%, about 90%, about 95%, between about 50% and about 95%, and the like. Of course, any percentage of reduced contaminants may be provided between about 1 and about 100% and all are meant to be included in this disclosure.

Generally, at least one anode may be located in an environmental media including but not limited to underground environment, a saturated subsurface, unsaturated subsurface, wastewater, soil, groundwater, sediment, surface water, petroleum-impacted saturated soils, and the like. The MFC may indirectly provide oxygen as a terminal electron acceptor to the otherwise anaerobic degradation pathways, through an introduction of a solid electrode to an anaerobic environment (anode). Since direct exposure of anaerobic microbes to oxygen can be detrimental, the use of MFC technology can safely manipulate the system to offer a more thermodynamically favorable pathway for the biodegradation of petroleum hydrocarbons in an anaerobic environment such as most groundwater. Embodiments may provide a MFC design that can be applied in the field for in-situ degradation of petroleum-impacted saturated soils and groundwater as may be understood from FIGS. 2 and 3. For example, at least one anaerobic microbial population may form a biofilm on at least one anode of an anode chamber. Using microbial fuel cells, in situ, may provide a low cost alternative to aerating or adding electron donors to boost aerobic metabolism which may even require no auxiliary power and little maintenance.

Other embodiments may include a representative system design and its derivatives, proton bridge constituents, methods of installation, system operation, optimizations, or the like. Of course other embodiments may use ex-situ options.

FIGS. 2 and 3 provide examples of a two-chamber microbial fuel cell system which may be used to enhance biodegradation of contaminants such as petroleum hydrocarbons in groundwater. An anode chamber (13) may be established in an environmental media (22). In embodiments, an anode chamber may include a subsurface environment. A central cathode (17) may be installed at, on or even near a surface (perhaps to be exposed to ambient air) to consume electrons harvested from the anaerobic biodegradation of petroleum compounds in the groundwater in the anode chamber. A network of proton bridges (21) conduits may be advanced underground and perhaps inside a saturated zone. In order to keep anaerobic conditions within the anode chamber (13), proton bridges may be placed through proton bridge matrix bore holes (27). This distribution of proton bridges can provide adequate coverage for the area to be treated.

Example 1

Materials and Methods

The study was initially conducted using a single-cell MFC design, which showed apparent power generation from the degradation of DRO that was used as the sole substrate. A double-cell design was implemented in this study to eliminate the potential for oxygen diffusion across the air/water exposed cathode as in a single-cell design and, thus, improved overall data interpretation.

Double-Cell MFC Design

Six double-cell MFCs were constructed using two 450-ml glass jars with a silicone-coated lid on the anode chamber and no lid on the cathode chamber. A 12.5-g stainless steel anode (~1-cm width stainless steel ribbon; Chore Boy® stainless steel scrubber, Reckitt Benckiser Inc., Parsippany, N.J., USA) was placed inside the anode chamber and attached to a stainless steel wire using a stainless steel nut and bolt. The wire was passed through a hole in the lid, which was sealed with silicone. The two chambers were connected with a 45-cm proton bridge with a 1.3-cm inner diameter, inserted through a hole in the lid of the anode chamber and sealed with silicone to maintain anaerobic conditions. The anode was connected externally to a 1 KΩ resistor, which was connected to a 4.5-cm2 piece of a commercially available cathode material (E-TEK Division, A3STDSI, 0.35 mg Pt/cm2) with a 20-gauge copper wire that was connected to the cathode with conductive silver epoxy that was covered in silicone.

Cell Media and Inoculum

The cathode chamber of each MFC was filled with sterile phosphate buffer and aerated to maintain an oxygenated environment near the cathode. The anode chamber was filled with a 1:1 mixture of phosphate buffer and diesel contaminated groundwater collected from a local refinery (Cheyenne, Wyo., USA) as inoculum. Surfactant (Palmolive® dish soap) was mixed into the phosphate buffer/diesel mixture at a final concentration of 2 ml/L. The anode chamber was refreshed every two weeks for 1.5 months until the cells were producing between 80 and 122 mV.

Hydrocarbon Degradation Experiments

The anode chamber of each of 6 MFCs was filled with 450 ml of phosphate buffer containing a nominal concentration of 300 mg diesel/L and 2 ml surfactant/L that was purged with nitrogen gas and mixed thoroughly for 2 h. The 6 MFCs were divided into one control and one experimental group each with 3 replicates. In the experimental group, the external circuit of the cell was connected normally and in the control treatment the cathode was removed from the cathode chamber to disconnect this circuit. All anode chambers were incubated in a water bath for 21-d at 30° C. to maintain high microbial activity. Twenty-milliliter water samples were collected from each anode chamber on days 1, 5, 15, and 21 and analyzed for DRO and major anions. We conducted statistical comparisons of DRO and sulfate among treatments with ANOVA ($\alpha=0.05$) using Minitab™ Version 13.31 (Minitab Statistical Software, Minitab Inc.). An initial water sample was not collected on d 0 to allow the DRO concentration in each cell to approach equilibrium because DRO concentrations actually increased after the initial sample was taken on d 0 in a preliminary test. Cell potential (mV) was measured every 10 min with a data logger (ADC-16; Pico Technologies Limited, UK) connected to a computer.

Power density and polarization curves were generated for one of the connected MFCs by measuring cell potential at resistances ranging from 500 to 50,000Ω) and the internal resistance was calculated using the slope of the polarization curve as described in Logan et al. (2006).

Microbial Characterization

In order to identify bacteria that were potentially using the anode as an electron acceptor, the microbial community forming a biofilm on the anode of a single-cell MFC was analyzed. DNA was extracted directly from the anode material using the MO BIO UltraClean™ Soil DNA Kit (Carlsbad, Calif., USA) according to the manufacturer's protocol. Bacterial 16S rRNA genes were PCR-amplified using universal primers 8F and 1492R (Weisburg et al. 1991). Amplification conditions were as described by Weisburg et al. (1991). PCR products were cloned with the TOPO TA Cloning Kit (Invitrogen, Carlsbad, Calif., USA) according to the manufacturer's protocol. Clones were screened for the presence of the gene inserts using PCR with vector—specific M13 primers, generating a library of 58 total clone inserts. Amplified rDNA restriction analysis (ARDRA) was performed visually from MspI restriction enzyme (Promega, Madison, Wis., USA) digested products containing an insert. One clone was sequenced for each unique ARDRA pattern, or about half of clones from patterns observed four or more times. Sequencing was performed by Macromolecular Resources (Colorado State University, Fort Collins, Colo., USA).

The National Center for Biotechnology Information GenBank database and the BLAST alignment tool (National Center for Biotechnology Information 2007) were used to determine the closest matches of DNA sequences to known microorganisms. All 16S rRNA gene matches were verified using the Sequence Match tool of Ribosomal Database Project II (RDP) (Cole et al. 2007). A literature survey was performed to assign putative functional properties based on those observed for the closest matches. All DNA sequences have been submitted to GenBank and are available under accession numbers EF619929-EF619958.

Chemical Analyses

Diesel range organics were extracted using methylene chloride ($CH_2Cl_2$) and analyzed with a gas chromatograph-flame ionization detector (GC-FID) equipped with a Tekmar #8 trap and 30 M×0.53 mm DB-5 column (US Environmental Protection Agency, Non-halogenated Organics using GC/FID, EPA Method SW8015, 1996). Nitrate ($NO_3-$) and sulfate ($SO_4^{2-}$) concentrations were analyzed on a DIONEX DX-100 Ion Chromatograph equipped with a 4×250-mm IonPac AS14 anion exchange column. Dissolved oxygen could not be measured without exposing the anode chamber of each MFC to ambient air, therefore, resazurin (1.0 mg/L) used to determine the redox potential in a representative MFC that was setup the same as the 6 MFCs used in this study.

Results

Hydrocarbon Degradation

Figure 4A:
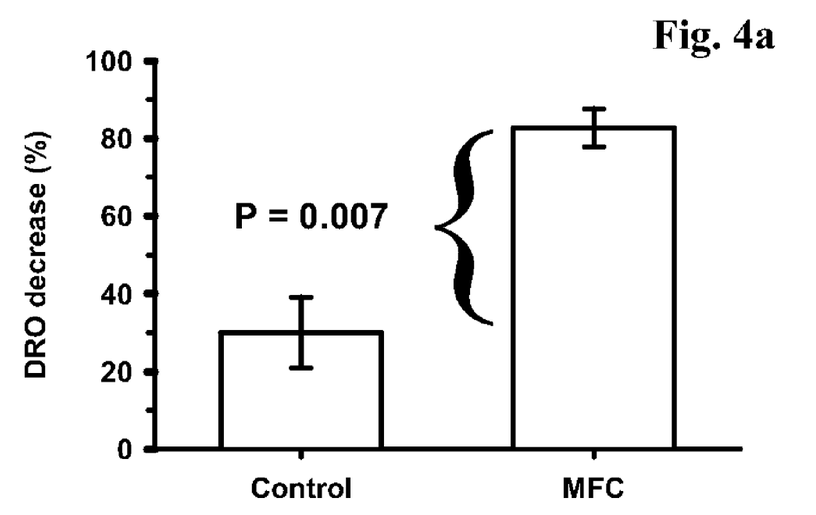
Figure 4B:
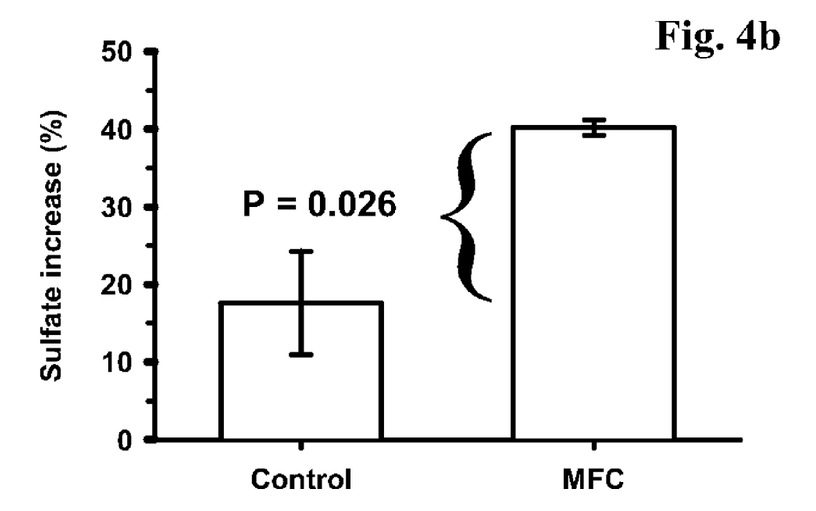
Figure 5:
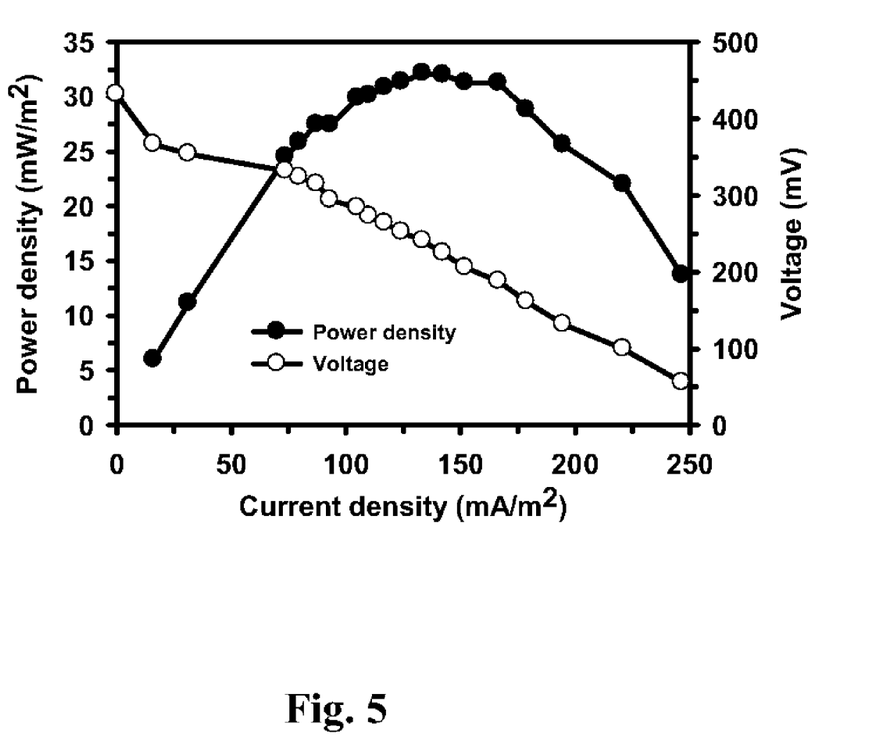
FIG. 5 shows an example of power density (●) and polarization (○) curves measured in a double-cell MFC using a resistor substitution box with resistances ranging from 500 to 50,000Ω as resulted from an experiment.
Figure 6:
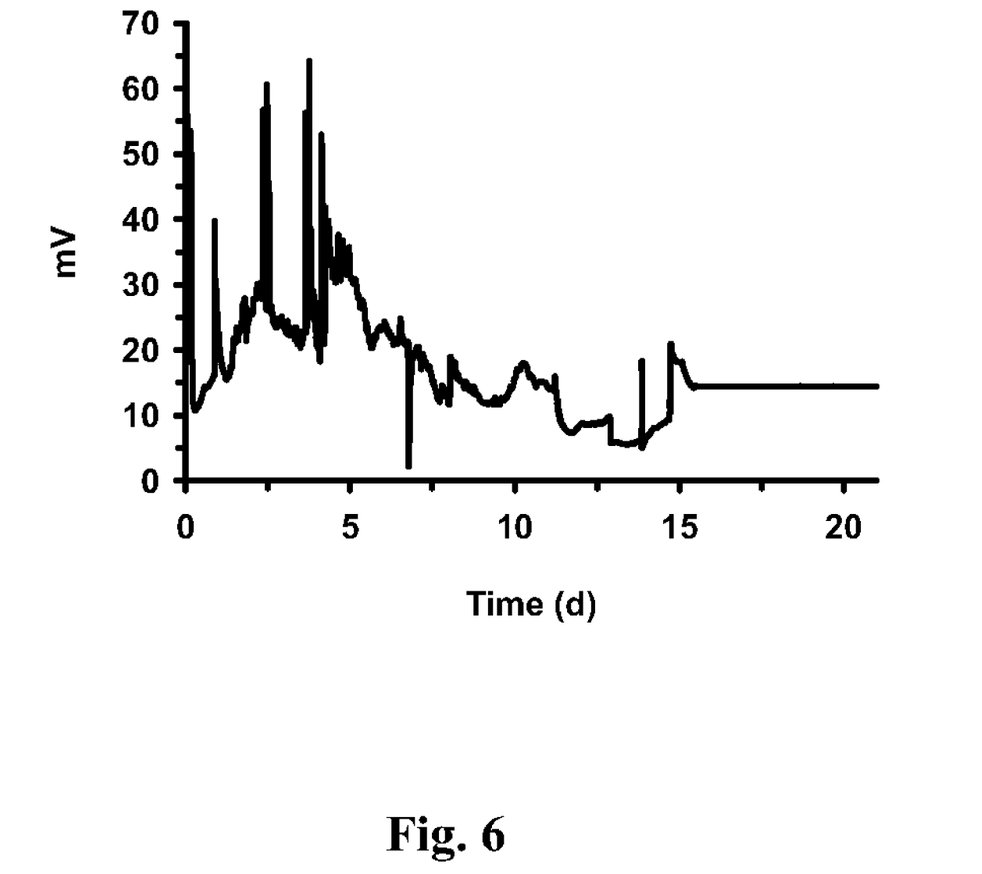
FIG. 6 shows an average (n=3) cell potential (mV) of a double-cell MFCs during a 21-d experiment. Each cell had a 1 KΩ external resistance and a 4.5-cm2 cathode. Measurements were taken automatically with a data logger every 10 min.

The DRO concentrations in the MFCs decreased by 31% in the control (from 241 to 167 mg DRO/L) and by 82% in the working MFCs (from 176 to 31 mg DRO/L) from day 1 to day 21 (FIG. 4a). The percent decrease in DRO in the working MFCs was significantly greater (P=0.007) from day 1 to day 21 compared to controls. Conversely, sulfate concentrations increased by 18% (from 68 to 80 mg $SO_4^{2-}$/L) in the controls and by 40% (from 67 to 94 mg $SO_4^{2-}$/L) in the working MFCs from day 1 to day 21 (FIG. 4b). The percent increase in sulfate in the working MFCs was also significantly (P=0.026) higher than in the controls. Nitrate concentrations were below detection limit (0.08 mg/L) throughout the experiment. Maximum power generation in the MFC was 32 mW/m2 and the internal resistance determined from the power density curve was 3,213Ω (FIG. 5). The average cell potential (mV) was elevated initially (160 mV) immediately after it was refilled, but quickly decreased to 10 mV as the system came to equilibrium after 5 hours. The cell potential then increased over the first 4 to 5 days of the test (peaking at 60 to 65 mV) then began to gradually decrease and became stable at ~15 mV for the remainder of the 21-d experiment (FIG. 6). The resazurin added to the representative MFC turned a light pink color. This indicates that this anode chamber was well sealed and anaerobic (reducing) conditions were maintained.

Microbial Characterization

Figure 7:
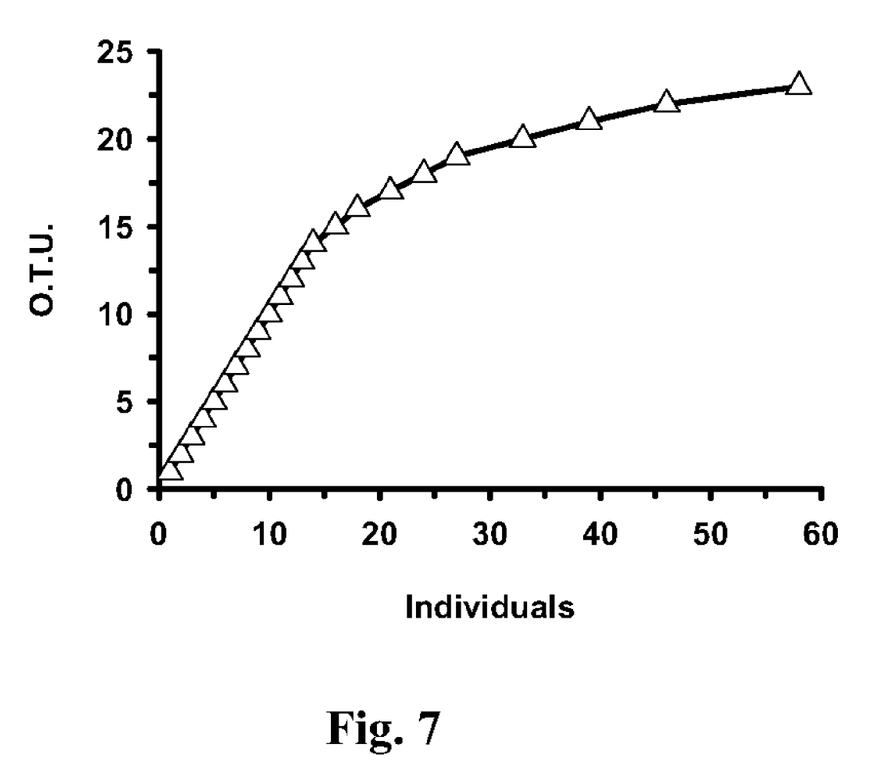
FIG. 7 shows a rarefraction analysis of amplified ribosomal DNA restriction analysis (ARDRA) patterns as a result of an experiment. The x-axis represents the number of clones screened and the y-axis represents how many unique operational taxonomical units (O.T.U.) were observed.

Rarefraction analysis of the ARDRA patterns indicated that the clone library provided good representation of the total bacterial community present on the anode (FIG. 7). Based on ARDRA patterns and DNA sequence analysis, γ-Proteobacteria was the most dominant class (81% of the clone library), and *Citrobacter* (20% of the clone library) was the most common genus. A literature review of corresponding matches indicated that facultative γ-Proteobacteria capable of nitrate-reduction, including *Citramonas* sp., *Pseudomonas* sp., and *Stenotrophomonas* sp., were dominant on the anode. High matches with organisms capable of utilizing alternative electron acceptors such as arsenate and chlorinated organics were also found, in addition to at least one sulfate reducer. *Shewanella* sp. ANA-3, an organism known for its versatile electron acceptor utilization capabilities, was identified as 10% of the total library.

Example 2

Cathode Fabrication

Four different cathodes were tested in these experiments. The first two cathodes were made by smearing a PbO2-paste (0.65 g PbO2; Fisher Scientific, S75147) mixed with 0.5 ml of either 1-butanol (Sigma-Aldrich, 360465) or Nafion perfluorinated ion-exchange resin (Nafion; Sigma-Aldrich, 274704) on both sides of a 16-cm2 piece of 0.02-inch thick titanium (Ti) sheeting (McMaster-Carr, 9051K37). These two cathodes are referred to hereafter as PbO2/Ti (butanol) and PbO2/Ti (Nafion). The third cathode was made by smearing a carbon-Pt paste on both sides of a 16-cm2 piece of Ti (as with the first two cathodes). The paste for this cathode was made with 0.08 g of Vulcan XC-72 carbon black with 10% Pt (E-TEK Division, C1-10 with 10% HPPt) and 0.5 ml of Nafion resulting in 0.25 mg Pt/cm2 of cathode. This cathode is referred to hereafter as PtC/Ti (Nafion). These cathodes were allowed to air dry overnight, after applying the respective paste mixtures. The fourth cathode was a 16-cm2 piece of a commercially available phosphoric acid fuel cell electrode on toray carbon paper (E-TEK Division, A3STDSI, 0.35 mg Pt/cm2), which had Pt on one side only (referred to hereafter as commercial cathode).

Bacterial Culture and Growth Media

The MFC was inoculated with a mixed bacterial culture indigenous to the local municipal waste water treatment plant in Laramie, Wyo., USA. The anode and cathode chambers of the double-cell MFC were filled with a phosphate buffer media that had been boiled for 30 min and gassed with nitrogen. The anode chamber contained 500 mg glucose/L as a substrate.

Microbial Fuel Cell Design

A double-cell MFC was constructed using two 450-ml glass jars with a silicone-coated lid on the anode chamber and no lid on the cathode chamber. The cathode chamber was filled with 450 ml of sterile phosphate buffer with no substrate. A carbon-cloth anode (5·10 cm; E-TEK Division, B-1/B, no wet-proofing) was placed inside the anode chamber and one edge was draped over the edge of the chamber with the lid threaded over the anode so that part of the anode was outside of the chamber for external circuit attachment. The two chambers were connected with a 45-cm proton bridge. This bridge was made using 0.5-inch inner-diameter vinyl tubing, which was filled with a warm mixture containing 3.75MKCl (Sigma-Aldrich, P3911) and 3% non-nutrient agar (by weight; Difco Laboratories, 0140-01) in deionized water that was allowed to cool and solidify in the tube. The bridge was inserted through a hole in the lid of the anode chamber and sealed with silicone to maintain anaerobic conditions. The anode was connected externally to the cathode with a 20-gauge copper wire attached to stainless steel alligator clips on each end. The alligator clips attached to the cathode and anode did not come into contact with the solution in each chamber at anytime. This design enabled us to quickly switch between different cathode types without disturbing the system so that each cathode could be compared on the same MFC within minutes.

Cathode Performance

The first three cathodes with a Ti base were only submerged halfway; therefore, only 16 cm2 of the 32-cm2 cathode (double-sided) was used. The commercial cathode was submerged fully (except for the point of contact with the alligator clip) because this cathode only had Pt coating on one side, therefore, the same catalytic surface area (16 cm2) was submerged for all cathodes. Maximum power generation was determined for each cathode by measuring voltage across a series of different resistances with a multimeter. The external resistance was varied from 50,000Ω to 50Ω and then backup to 50,000 using a resistor substitution box (Model RS-500, Elenco Electronics Inc., Wheeling, Ill., USA). Voltage readings were allowed to stabilize for approximately 1 min between each reading and power density and polarization curves were generated for each cathode using the average value measured at each resistance (n=2). Data was collected for all cathodes on the same MFC within 1.5 h in the following order: PbO2/Ti (Nafion), PtC/Ti (Naf-ion), PbO2/Ti (butanol), and commercial cathode.

Cathode Cost Estimates

General cost estimates were made for each of the three Ti-based cathodes based on the retail cost of the materials used to manufacture each cathode. The cost of the commercial cathode was simply the retail cost, which was $1.46/cm2 (a 900-cm2 sheet=$1310.09).

Results

Cathode Performance

Figure 8A:
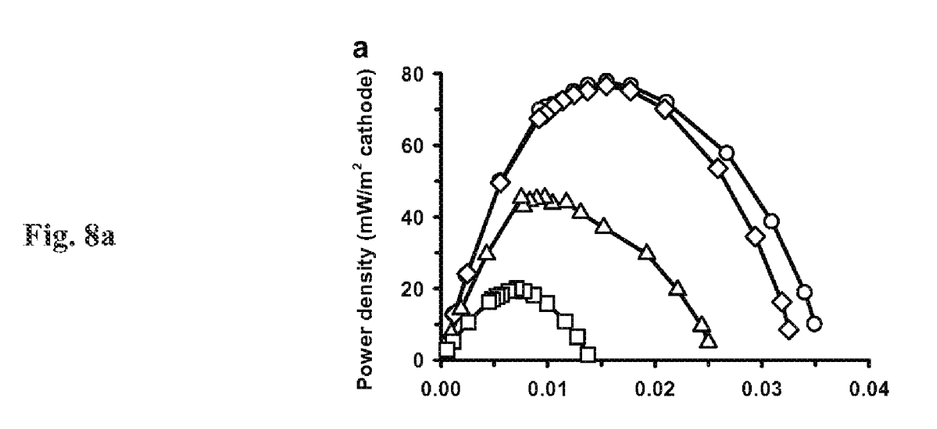
FIGS. 8a and 8b show a power density (a) and polarization (b) curves for various cathodes described including: PbO2/Ti (butanol; ○), PbO2/Ti (Nafion; ◇), PtC/Ti (Nafion; Δ), and a commercial cathode (□). These curves were generated by measuring cell potential across various resistances ranging from 50Ω to 50,000Ω (current was calculated using V=I·R).
Figure 8B:
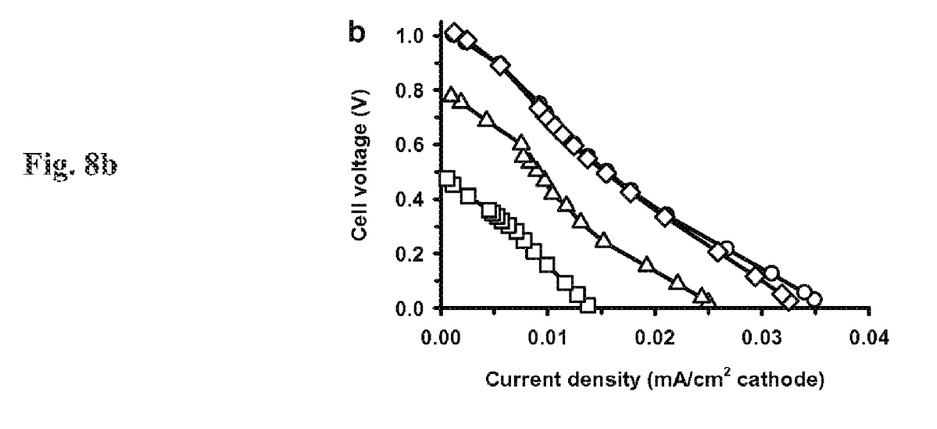

The PbO2/Ti (butanol) and PbO2/Ti (Nafion) cathodes generated nearly equal power (77 and 78 mW/m2 cathode, respectively), which was 1.7-3.9× more power than the PtC/Ti (Nafion) or commercial cathodes, respectively. The PbO2/Ti (butanol) and PbO2/Ti (Nafion) cathodes also had similar optimal external resistances (2000Ω; Table 1), evident from their power density curves (FIG. 8a), and they had similar values of internal resistance (1963Ω and 1804Ω, respectively; Table 1) calculated from their polarization curves (FIG. 8b).

TABLE 1

Relative performance of various cathodes in a double-cell microbial fuel cell

| Cathode Material | Optimal external resistance (Ω) | Calculated internal resistance (Ω) | Maximum power (mW/m2 cathode) | Power per cost of cathode materials (μW/$) |
|---|---|---|---|---|
| PbO2/Ti (butanol) | 2000 | 1963 | 77 | 612.0 |
| PbO2/Ti (Nafion) | 2000 | 1804 | 78 | 134.0 |
| PtC/Ti (Nafion) | 3000 | 2040 | 45 | 45.0 |
| Commercial cathode[a] | 2000 | 2214 | 20 | 1.4[b] |

[a]E-TEK Division, A3STDSI, 0.35 mg Pt/cm2, www.etek-inc.com.
[b]Calculation based on retail cost and not just the cost of materials.

Cathode Cost Estimates

The total cost of materials used to manufacture the double-sided, 16-cm2 PbO2/Ti (butanol), PbO2/Ti (Nafion), and PtC/Ti (Nafion) cathodes was $0.40, $1.85, and $3.23, respectively but only half of the electrode was sub-merged, therefore, the cost of the effective surface area for each of these cathodes was only $0.20, $0.93, and $1.61, respectively. The cost for the 16-cm2 commercial cathode was $23.36. To get a sense of the relative cost of power generation using the different types of cathodes, the power produced using each cathode was normalized by the cost of the effective surface area of each, which was 16 cm2. The PbO2/Ti (butanol) cathode produced the most power per dollar (612 μW/$) followed by the PbO2/Ti (Nafion; 134 μW/$), PtC/Ti (Nafion; 45 μW/$), and the commercial cathode (1.4 μW/$).

As can be easily understood from the foregoing, the basic concepts of the present invention may be embodied in a variety of ways. It involves both fuel cell techniques as well as devices to accomplish the appropriate fuel cell. In this application, the fuel cell techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "degradation" should be understood to encompass disclosure of the act of "degrading"—whether explicitly discussed or not—and, conversely, were there effectively disclosure of the act of "degrading", such a disclosure should be understood to encompass disclosure of a "degradation" and even a "means for degrading." Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in this application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the fuel cell devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method of multi-purpose in-situ microbial fuel cell functions for waste remediation and energy generation comprising the steps of:
    creating an in-situ closed anaerobic anode chamber within an in-situ environmental media having at least one contaminant selected from a group consisting of a petroleum contaminant and a refined petroleum contaminant;
    providing at least one microbial population in said in-situ closed anaerobic anode chamber;
    metabolizing said at least one contaminant in said in-situ environmental media with said at least one microbial population to generate electrons and protons in said in-situ closed anaerobic anode chamber;
    remediatingly biodegrading at least some of said at least one contaminant;
    extracting electrons from said in-situ closed anaerobic anode chamber with at least one anode in said in-situ closed anaerobic anode chamber;
    transferring said electrons from said in-situ closed anaerobic anode chamber to an in-situ open cathode chamber through an external circuit, wherein said in-situ open cathode chamber is located at or near a surface of said in-situ environmental media;
    generating electrical power from said transfer of said electrons from said in-situ closed anaerobic anode chamber to said in-situ open cathode chamber;
    transferring protons from said in-situ closed anaerobic anode chamber to said in-situ open cathode chamber with a proton exchange connector between said at least one anode to at least one cathode of said in-situ open cathode chamber; and
    reacting oxygen with said protons in said in-situ open cathode chamber to create by-products.

2. The method according to claim 1 wherein said environmental media is selected from a group consisting of an underground environment, a saturated subsurface, unsaturated subsurface, soil, groundwater, sediment, surface water, and petroleum-impacted saturated soils.

3. The method according to claim 1 wherein said petroleum contaminant is selected from a group of petroleum subsurface contaminants, petroleum hydrocarbons, and petroleum compounds.

4. The method according to claim 1 wherein said refined petroleum contaminant is selected from a group consisting of refined petroleum subsurface contaminants, refined petroleum hydrocarbons, refined petroleum compounds, diesel, diesel range organic compounds, and gasoline.

5. The method according to claim 1 wherein said in-situ closed anaerobic anode chamber is located underground in said in-situ environmental media.

6. The method according to claim 1 and further comprising the step of driving an electrical current through said external circuit with a lead-containing cathode catalyst in said in-situ open cathode chamber.

7. The method according to claim 6 wherein said step of driving said electrical current through said external circuit with said lead-containing cathode catalyst comprises the step of driving said electrical current through said external circuit with a lead dioxide cathode catalyst in said in-situ open cathode chamber.

8. The method according to claim 1 and further comprising the step of driving an electrical current through said external circuit with a platinum-containing cathode catalyst in said in-situ open cathode chamber.

9. The method according to claim 1 and further comprising the step of driving an electrical current through said external circuit with a manganese-containing cathode catalyst in said in-situ open cathode chamber.

10. The method according to claim 1 wherein said at least one microbial population is selected from a group consisting of iron-reducing bacteria, denitrifying bacteria populations, sulfate-reducing bacteria populations, methanogenic bacteria, fermenting bacteria, *Citrobacter* sp., *Pseudomonas* sp., *Strehotrophomonas* sp., *Shewanella* sp. ANA-3, *Alishewanella* sp., γ-Proteobacteria, *Citramonas* sp., *Desulfovibrio* sp., and *Dechloromonas*.

11. The method according to claim 10 and further comprising the step of forming a biofilm of said at least one microbial population on said at least one anode of said in-situ closed anaerobic anode chamber.

12. The method according to claim 1 wherein said step of remediatingly biodegrading at least some of said at least one contaminant comprises the step of reducing said at least one contaminant by a reduction selected from a group consisting of:
   about 50%;
   about 55%;
   about 60%;
   about 65%;
   about 70%;
   about 75%;
   about 80%;
   about 85%;
   about 90%;
   about 95%; and
   between about 50% and about 95%.

13. The method according to claim 1 wherein said proton exchange connector comprises a conductive liquid medium.

14. The method according to claim 1 wherein said proton exchange connector comprise a proton exchange membrane.

15. The method according to claim 1 wherein said proton exchange connector comprise at least one proton bridge.

16. The method according to claim 1 wherein said step of transferring said protons from said in-situ closed anaerobic anode chamber to said in-situ open cathode chamber with said proton exchange connector comprises the step of transferring said protons from said in-situ closed anaerobic anode chamber to said in-situ open cathode chamber with a network of proton bridges between multiple anodes and said in-situ open cathode chamber.

17. The method according to claim 1 and further comprising the step of accepting said transferred electrons from said in-situ closed anaerobic anode chamber with at least one electron acceptor in said in-situ open cathode chamber, said electron acceptor is selected from a group consisting of permanganate, uranium, oxygen, oxygen-releasing compounds, peroxide, halogenated compounds, oxidants of permanganate, percabonate, cynide, selenium, persulfate, ozone, sulfate, nitrate, iron, manganese, arsenate, selenate, and chromate.

18. The method according to claim 1 wherein said step of reacting oxygen with said protons in said in-situ open cathode chamber comprises the step of producing water.

19. The method according to claim 1 wherein said step of reacting oxygen with said protons in said in-situ open cathode chamber comprises the step of reacting oxygen from ambient air with said protons in said in-situ open cathode chamber.

20. The method according to claim 1 wherein said step of reacting oxygen with said protons in said in-situ open cathode chamber comprises the step of reacting oxygen from oxygen releasing compounds with said protons in said in-situ open cathode chamber.

21. The method according to claim 1 wherein said oxygen releasing compounds are selected from a group consisting of permanganate and peroxide.

* * * * *